United States Patent [19]

Cappels

[11] Patent Number: 5,821,917
[45] Date of Patent: Oct. 13, 1998

[54] SYSTEM AND METHOD TO COMPENSATE FOR THE EFFECTS OF AGING OF THE PHOSPHORS AND FACEPLATE UPON COLOR ACCURACY IN A CATHODE RAY TUBE

[75] Inventor: Richard D. Cappels, San Jose, Calif.

[73] Assignee: Apple Computer, Inc., Cupertino, Calif.

[21] Appl. No.: 504,433

[22] Filed: Jul. 20, 1995

Related U.S. Application Data

[63] Continuation-in-part of Ser. No. 36,349, Mar. 24, 1993, Pat. No. 5,512,961.

[51] Int. Cl.⁶ .................................................. G09G 5/02
[52] U.S. Cl. .......................... 345/150; 345/22; 345/204; 348/173
[58] Field of Search ..................... 345/204, 207, 345/211, 212, 213, 214, 117, 22, 150, 151, 185, 203; 348/658, 173, 191, 175, 176, 189, 655, 656, 657, 675, 679

[56] References Cited

U.S. PATENT DOCUMENTS

| | | | |
|---|---|---|---|
| 4,126,814 | 11/1978 | Marlowe | 315/307 |
| 4,198,661 | 4/1980 | Gatten et al. | 348/173 |
| 4,700,218 | 10/1987 | Thomsen et al. | 358/29 |
| 4,703,345 | 10/1987 | Matsuzaki et al. | 358/74 |
| 4,742,387 | 5/1988 | Oshima | 358/29 |
| 4,746,970 | 5/1988 | Hosokawa et al. | 348/658 |
| 4,792,733 | 12/1988 | Redfern | 348/173 |
| 4,962,418 | 10/1990 | Kamaga | 348/658 |
| 5,181,103 | 1/1993 | Tatsuya | 358/64 |
| 5,193,006 | 3/1993 | Yamazaki | 348/173 |
| 5,258,828 | 11/1993 | Sano et al. | 358/29 |
| 5,276,779 | 1/1994 | Statt | 395/109 |
| 5,510,851 | 4/1996 | Foley et al. | 348/658 |
| 5,512,961 | 4/1996 | Cappels, Sr. | 348/658 |

FOREIGN PATENT DOCUMENTS

| | | | |
|---|---|---|---|
| 0313795 | 5/1989 | European Pat. Off. | H04N 17/02 |
| 7107508 | 4/1995 | Japan . | |
| 2169773 | 7/1986 | United Kingdom | H04N 0/73 |
| 9312616 | 6/1993 | WIPO . | |
| 9422270 | 9/1994 | WIPO . | |

OTHER PUBLICATIONS

D.L. MacAdam, Color Measurement, Theme and Variation, 2nd Ed., pp. 9–21.

Steve Roth, Managing Color, Jan. 1993 –Macworld, pp. 148, 150–155.

Bruce Fraser, Getting Color in Sync, Mar., 1993 –MacUser, pp. 165–167; 178–181.

Hitoshi Takaoka, Yoshinori Ogata, "A New Input Modulation Method For Generating Expected Colors On A CRT Monitor," 1991, pp. 57–60.

*Primary Examiner*—Xiao Wu
*Attorney, Agent, or Firm*—Carr & Ferrell LLP; Gregory J. Koerner

[57] ABSTRACT

A system and method of compensating for the effects of aging of phosphors and faceplate upon color accuracy in cathode ray tubes, wherein beam current measurements are made upon individual cathodes of a cathode ray tube to sample the individual beam currents at periodic intervals. The sum-totals of the individual beam current measurements are then stored in a non-volatile memory location. Correction factors are calculated for both luminous efficiency degradation and for deviations in hue, based on the stored sum-total beam current measurements in combination with empirically-derived formulae. These correction factors are then used to calculate corrected tristimulus values X, Y, and Z. The corrected tristimulus values are used to calculate the amount of beam current necessary to compensate for color degradation of the cathode ray tube. Finally, the respective gains of the video amplifiers are adjusted to achieve the amount of beam current necessary to compensate for the effects of aging of the cathode ray tube.

16 Claims, 7 Drawing Sheets

FIG. 5:
Green phosphor (ZnS:Cu,Al) in P-22 has a more graceful degradation curve than blue (ZnS:Ag), and is similar to red (Y2O2S:Eu). Above, green (lower curve) and red (upper curve) efficiency show close approximation to Pfhanl's Law (two curves are plotted). The horizontal axis is exposure in Coulombs per square centimeter. The vertical axis is relative luminance.

FIG. 6: The characteristic shape of degradation of blue phosphor (ZnS:Ag) measured on Trinitron displays at Apple Computer and Sony. The scale for the horizontal axis is Coulombs/square cm. The scale for the vertical axis is aged intensity relative to initial intensity.
43 Coulombs corresponds to 14,000 hours at about 35 fL in the experiment at 22 kv.

SYSTEM AND METHOD TO COMPENSATE FOR THE EFFECTS OF AGING OF THE PHOSPHORS AND FACEPLATE UPON COLOR ACCURACY IN A CATHODE RAY TUBE

CROSS-REFERENCE TO RELATED APPLICATION

The present invention is a continuation-in-part of U.S. patent application Ser. No. 08/036,349 filed Mar. 24, 1993, now U.S. Pat. No. 5,512,961 by Richard D. Cappels, Sr., and entitled "Method And System Of Achieving Accurate White Point Setting Of A CRT Display," which is hereby incorporated by reference.

BACKGROUND OF THE INVENTION

1. Field of the Invention

This invention relates to computer displays and more particularly to a system and method of compensating for the detrimental effects upon color accuracy resulting from aging of phosphors and faceplates in cathode ray tubes (CRTs).

2. Discussion of the Prior Art

Maintaining color accuracy in computer monitors is of increasing concern to many computer users as well computer manufacturers. The proliferation of use of computers in applications where color accuracy is critical makes faithful color reproduction more than merely an aesthetically pleasing feature in a computer monitor. Fields where color accuracy may be critical include medicine, computer graphics, and engineering design work, for example.

Tristimulus values, as further explained in *Color Measurement, Theme and Variation*, D. L. MacAdam, 2nd ed., Springer-Verlag, pp. 9–21, represent the amount of energy of light in overlapping bands referred to as X, Y, and Z. The X, Y, and Z bands correspond to the three channels of a model of human color vision known as the C.I.E. standard of 1976, in which average observers perceive specific hues according to the ratios of light energy in the three bands. The tristimulus value ratio corresponds to a particular hue. Further, the summed weighted energies of these three bands describe the intensity or luminance of the light. Thus, a given set of tristimulus values represents a specific hue at a specific luminance.

The X, Y, and Z channels of the viewer's eyes are stimulated by corresponding red, green and blue phosphors being bombarded with electrons. The degree of stimulation of each of the three channels depends upon the particular type of phosphors being bombarded with electrons.

Various factors cause degradation of color produced by computer monitors. One significant factor is aging of the cathode ray tube. Over time, electron and ion bombardment changes the hue and luminous efficiency of the light emitted from the phosphors used in the face of a cathode ray tube. The mechanism of these changes is thought to be the generation of non-emitting recombination centers and/or the loss of activator centers due to changes in the state of ionization of activator constituents. Each of the three primary colors uses a respective phosphor having a different chemical composition, hence having a different rate of deterioration and aging, which also contributes to the total hue shift.

The rate of color degradation depends primarily upon beam current, acceleration voltage, and CRT temperature. If the acceleration voltage and temperature are held constant, as is typical in CRT displays, then phosphor degradation in substantially a function of the accumulated number of Coulombs of beam current passed through the cathode and deposited on the phosphors of the CRT through its history of operation.

Another significant contribution to color degradation is the aging of the CRT's glass faceplate. High-energy electron and X-ray bombardment changes the chemical structure of the faceplate glass and unevenly reduces its transmission of light, dramatically more at shorter wavelengths than at medium and longer wavelengths, thus shifting the transmission of hues toward yellow. The faceplate's rate of change in its transmission of light depends primarily upon the total amount beam current and acceleration voltage over time. If the acceleration voltage and image area are held constant, then the CRT transparency change is substantially a function of the total number of accumulated Coulombs of beam current directed at the faceplate.

Figure 1:
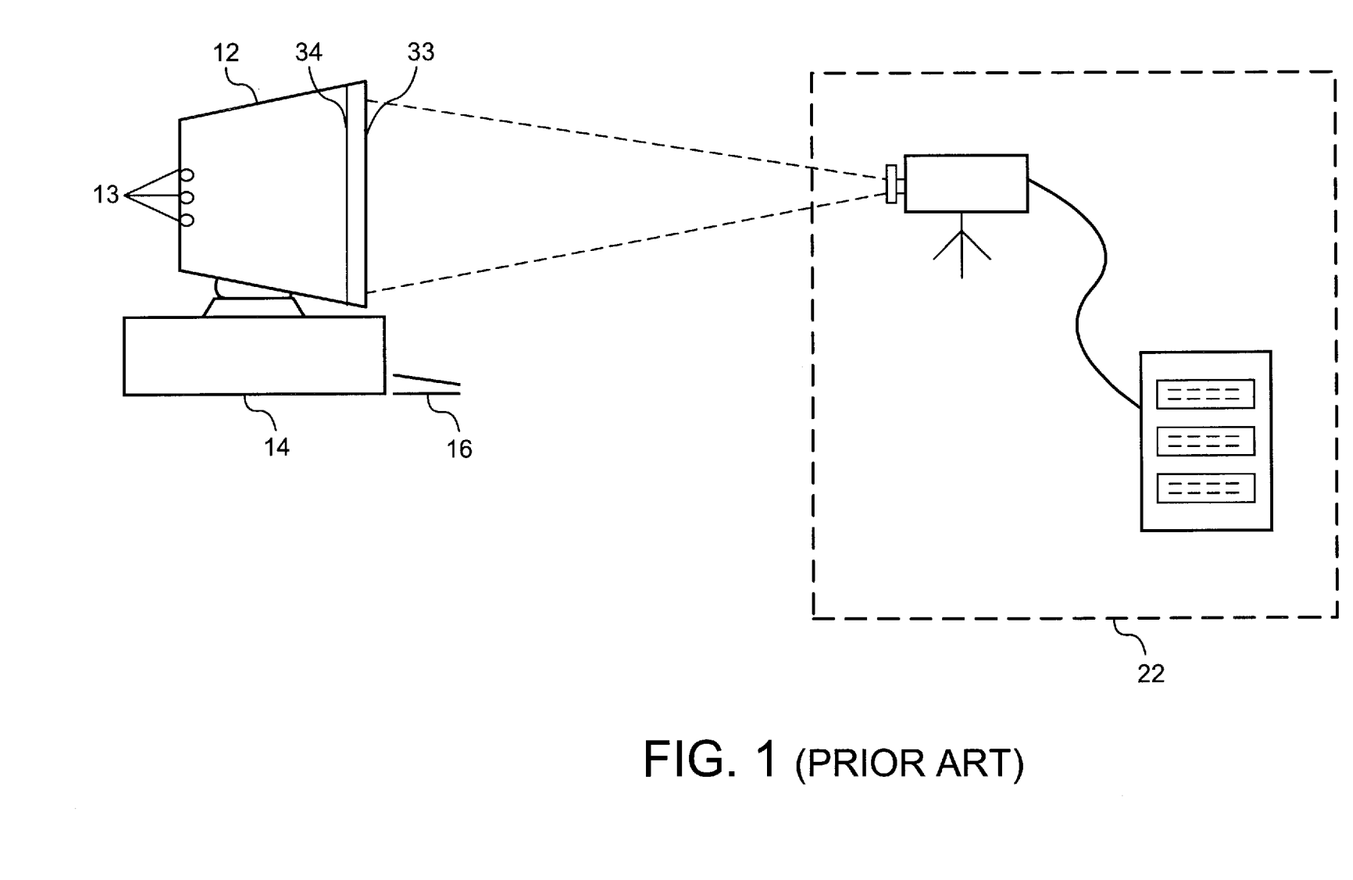
FIG. 1 is a block diagram showing a prior art system for measuring and adjusting the color content of a video display.

Attempts to compensate for color degradation in computer monitors have conventionally taken several approaches. Referring to the drawings, FIG. 1 shows a prior art system for compensating against the effects of aging of phosphors 34 and faceplate 33 in a video display 12. The computer monitor is provided with manual individual color controls 13 to enable adjusting the red, green, and blue video amplifier gains and the overall luminance level, and thus the amounts of red, blue, and green on video display 12. This "eyeballing" approach is inaccurate unless complemented with a spectra-radiometer for measuring the tristimulus values of light emitted from the video display 12. The spectra-radiometer 22 could be replaced by another conventional light measuring device, such as a photometer. To compensate for color degradation in video display 12, CPU 14 generates a known-chromaticity image such as a white screen, which is displayed on the video display 12. Spectraradiometer 22 measures and displays the tristimulus values of this image, and thus, the amounts of red, blue, and green on video display 12 can be adjusted using color controls 13 located on the video display 12. The color controls 13 are adjusted until the tristimulus value readings on the spectraradiometer 22 match the expected chromaticity readings of the image being produced by CPU 14.

Another conventional approach supplies the user with an achromatic card, or a series of colored cards, that serve as color standards for matching to test patterns generated by the CPU 14. This system is also somewhat inaccurate, and is time consuming.

Therefore, an improved system and method is needed to compensate accurately for degradation of color in cathode ray tubes due to phosphor and faceplate aging.

SUMMARY OF THE INVENTION

In accordance with the present invention, a system and method are disclosed for compensating for the effects of aging of the phosphors and faceplate upon color accuracy in cathode ray tubes. In the preferred embodiment of the present invention, an internal processor generates and communicates a digital video signal to a display controller. The display controller converts the digital video signal into individual analog video signals corresponding to red, green, and blue primaries. The display controller transmits the analog signals to red, green, and blue video amplifiers which amplify the video signals, producing red, green, and blue beam currents which drive the respective cathodes of a cathode ray tube.

Current samplers are coupled to the outputs of the respective video amplifiers to sample the individual beam currents.

The output of each current sampler is fed into an analog-to-digital converter which converts the red, green, and blue analog beam current measurements into digital values. The digital values are read by the internal processor at periodic intervals, preferably initiated by a timer, and stored in a non-volatile memory location.

Red, green, and blue correction factors are calculated for both luminous efficiency degradation and for deviations in hue, based on the stored sum-total beam current measurements in combination with empirically-derived test data. These correction factors are used to calculate corrected tristimulus values X, Y, and Z for red, green, and blue. The corrected tristimulus values X, Y, and Z are then used to calculate the amount of each respective beam current necessary to compensate for color degradation due to aging of the cathode ray tube. Finally, the respective gains of the red, green, and blue video amplifiers are adjusted to achieve the beam current necessary to compensate for color degradation in the CRT.

DETAILED DESCRIPTION OF THE PREFERRED EMBODIMENT

Figure 2:
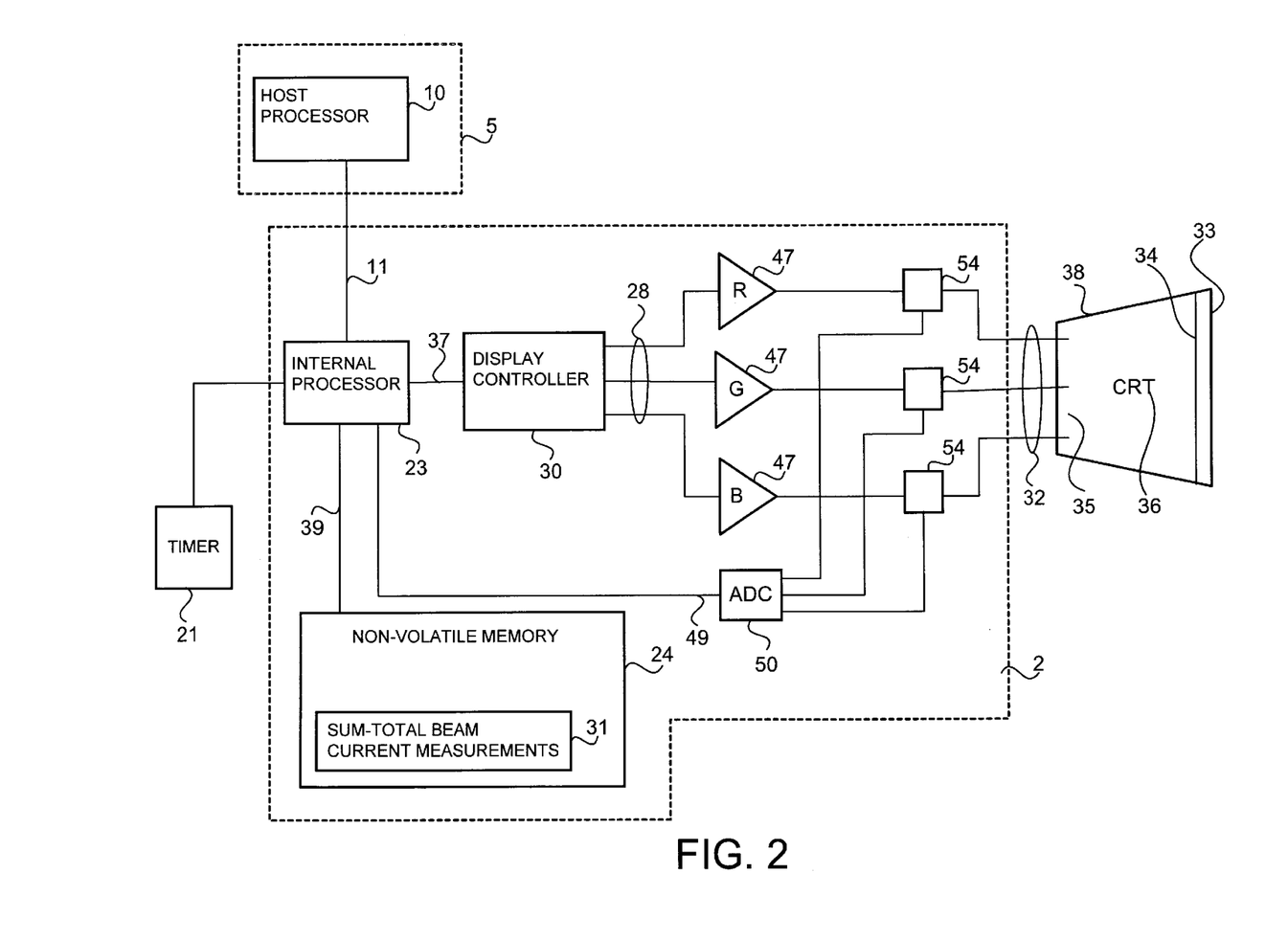
FIG. 2 is a schematic diagram of the present invention showing a system for compensating for the effects of aging of phosphors and the faceplate upon color accuracy in a cathode ray tube.

FIG. 2 shows an improved system, according to the present invention, for compensating for the effects of aging of phosphors 34 and a faceplate 33 upon color accuracy in a cathode ray tube (CRT) 36. The invention provides a CRT 36 with a timer 21, a measuring circuit 2 and a compensation circuit 5. In the preferred embodiment, a CRT 36 monitor cabinet 38 houses the components of the measuring circuit 2. This assures that the beam current history accompanies the CRT 36, rather than possibly becoming separated if stored in a host processor.

Host processor 10 is preferably a single-chip integrated circuit microprocessor based in an Apple Macintosh® computer manufactured by Apple Computer, Inc. of Cupertino, Calif. However, host processor 10 may be any computing processor, for example, a general purpose computer.

Host processor 10 communicates with internal processor 23 via a first digital data bus 11. Non-volatile memory 24, which may be an Electrically Erasable Programmable Read-Only Memory (EEPROM) or any other suitable non-volatile memory, communicates with internal processor 23 via a second digital data bus 39.

Internal processor 23 provides digital signals via a third digital data bus 37 to a display controller 30 wherein the received digital signals are conventionally converted into three discrete analog signals 28, which drive respective red, green and blue video amplifiers 47. Display controller 30 consists of a digital-to-analog converter and appropriate buffers for maintaining the voltage levels required to drive the video amplifiers 47 of a video display. The three video signals 28 are applied to respective video amplifiers 47, which are characterized typically by a high input impedance and an output impedance sufficiently low to drive a CRT 36. Video signals 28 are amplified to generate red, green, and blue beam currents on lines 32 which drive the respective cathodes 35 of CRT 36. CRT 36 is a conventional color cathode ray tube with red, green, and blue phosphors 34 deposited on the interior surface of the tube's face. Further, CRT 36 includes a glass faceplate 33 on the tube's exterior face. CRT 36 and its associated electrical components are preferably contained within video monitor cabinet 38, leaving only the faceplate 33 of CRT 36 exposed for viewing the displayed images.

The magnitudes of the beam currents on each of lines 32 are sensed by respective current samplers 54 to yield corresponding analog beam current measurements and provided to Analog-to Digital Converter (ADC) 50. Current samplers 54 are well known in the art and may consist, for example, of current mirrors or networks of passive electronic components. The individual analog beam current samples are converted by ADC 50 to digital beam current measurements, which are then communicated along a fourth digital data bus 49 to internal processor 23.

A conventional timer 21 is connected to internal processor 23, and at periodic intervals provides clock signals to initiate red, green, and blue beam current measurements to be performed by internal processor 23.

Figure 3:
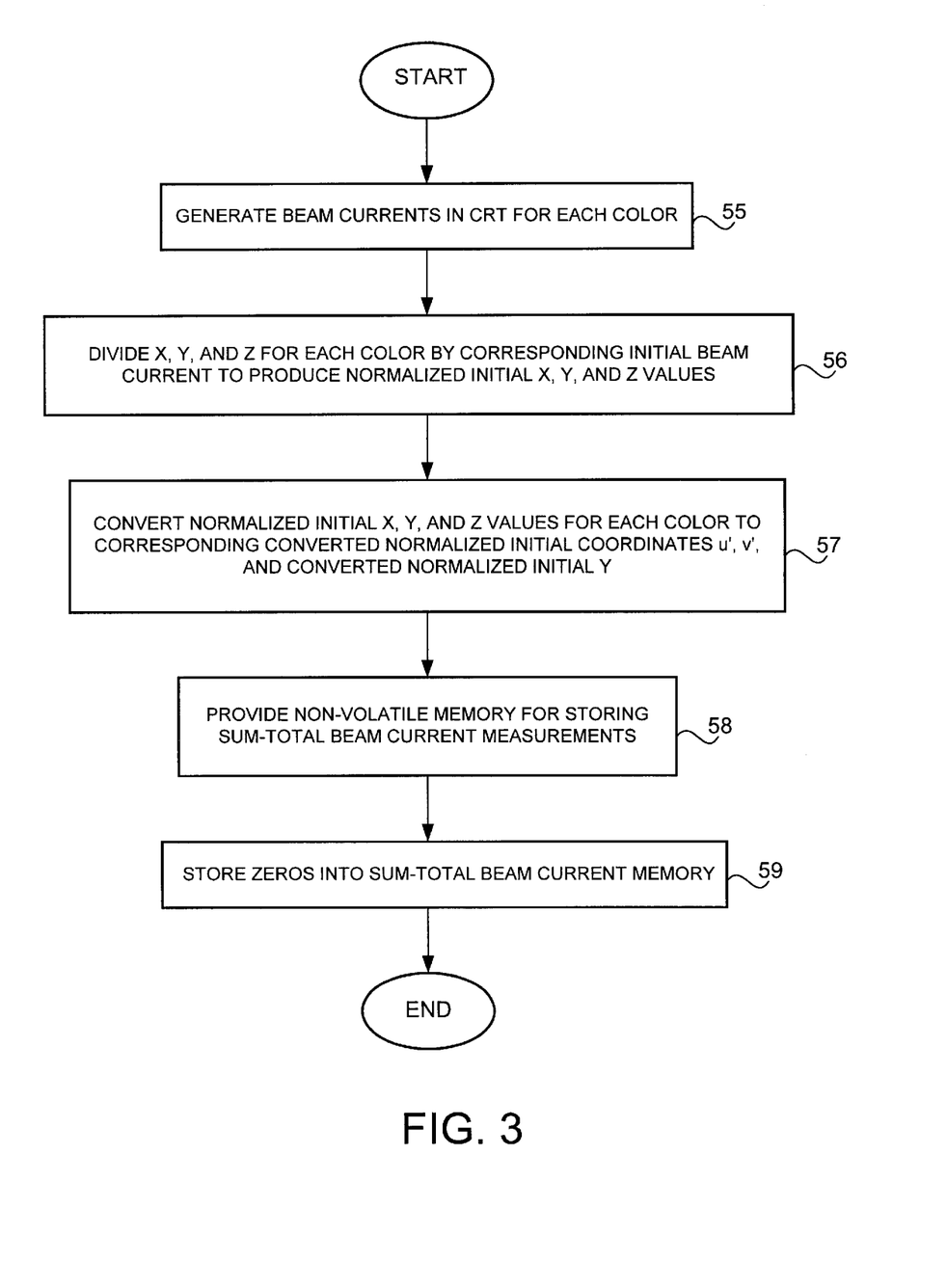
FIG. 3 is a flowchart of process steps for initializing a system during manufacture according to the present invention.

FIG. 3 is a flowchart of preliminary steps which typically occur during manufacture of the CRT. In step 55, a beam current is generated for each color. In step 56, initial values X, Y, and Z are divided by the corresponding color beam current value to produce normalized initial tristimulus values X, Y, and Z for each color channel. Next, in step 57, the normalized initial tristimulus values are converted to equivalent color coordinates U', v', and normalized Y for each color. Then, in step 58, a non-volatile memory 24 is provided for storing sum-total beam current measurements for each color. In step 59, values of zero are stored into non-volatile memory 24 for each color.

Figure 4:
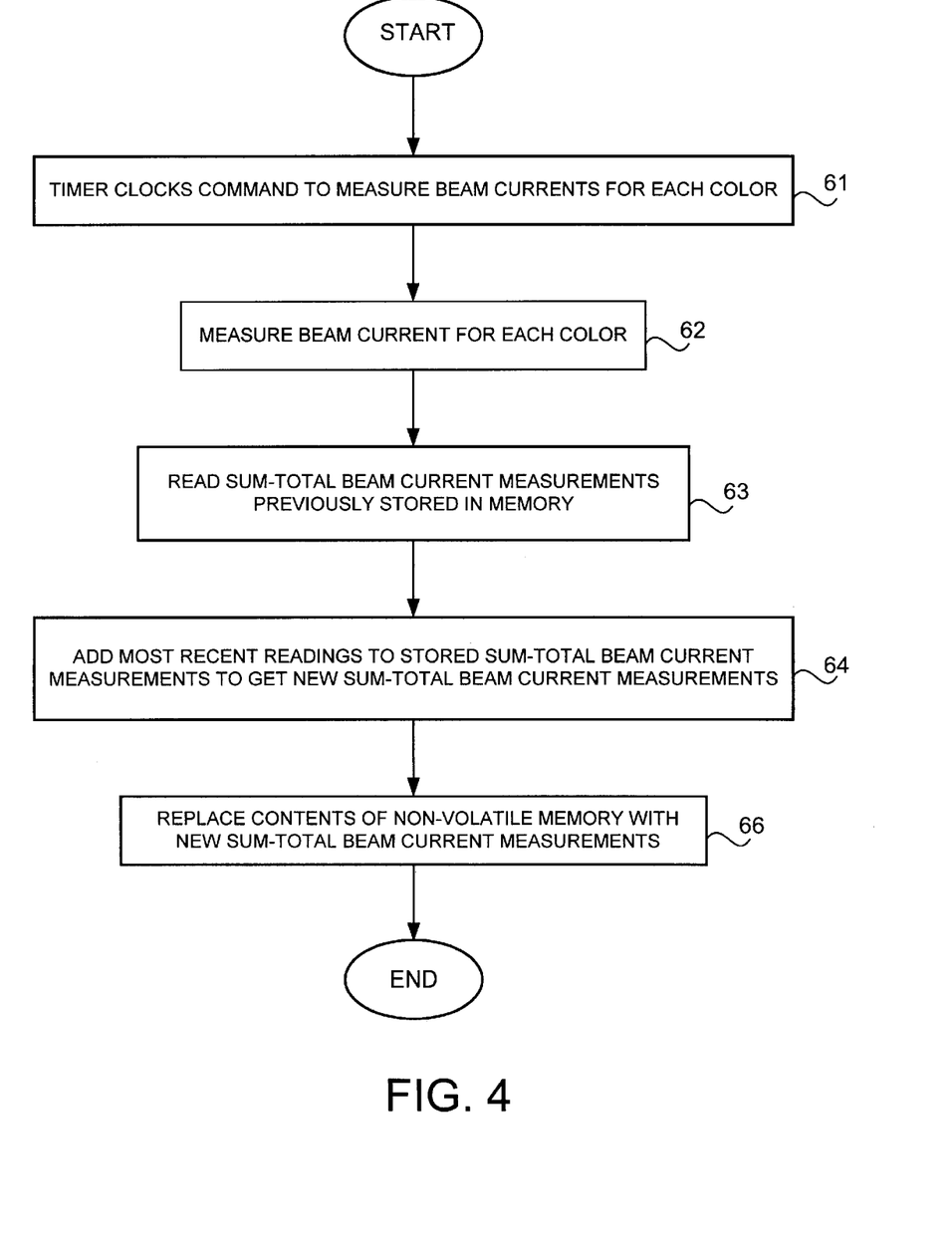
FIG. 4 is a flowchart of process steps for periodically measuring and storing red, green and blue primary sum-total beam current measurements.

FIG. 4 is a flowchart describing steps for periodic storage in non-volatile memory 24 of sum-total beam current measurements 31 for the outputs of the red, green, and blue video amplifiers 47. The FIG. 4 procedure begins in step 61, where timer 21 clocks internal processor 23 to generate a command to measure beam currents. Next, in step 62, internal processor 23 reads the digital output of ADC 50 to measure each color beam current. Then, in step 63, internal processor 23 reads the sum-total beam current measurement for each color previously stored in memory 24. In step 64, internal processor 23 adds the beam current measurement for each color to the contents of the non-volatile memory 24 for each color to obtain sum-total red beam current measurements 31 for each color. In step 66, internal processor 23 replaces the contents of non-volatile storage memory 24 with the newly-calculated sum-total beam current measurements 31 each color.

Figure 5:
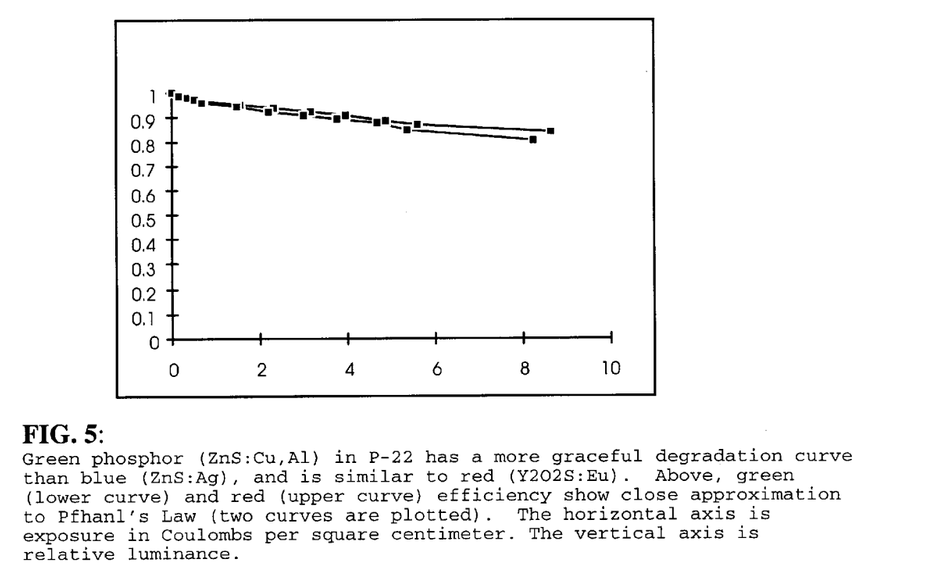
FIG. 5 is a graph of a luminous efficiency degradation curve for red and green hues based on empirical test data from Sony Trinitron® video monitors.

FIG. 5 is a graph of empirically-derived data for red and green luminous efficiency degradation of Trinitron® display monitors. The FIG. 5 graph conforms to luminous efficiency degradation factors predicted using a mathematical equation known as Pfahnl's Law. Pfahnl's Law yields acceptable luminous efficiency degradation factors for red and green, expressed as relative efficiency $\eta$. These red and green luminous efficiency degradation factors may be calculated by the formula $$\eta = \left( \frac{\eta_{(start)}}{1 + CN} \right)$$

where $\eta_{(start)}$ is the initial efficiency for a red or a green phosphor, C is the phosphor burn sensitivity parameter, and N is the dose of electrons deposited on the phosphors, expressed in Coulombs per square centimeter.

Figure 6:
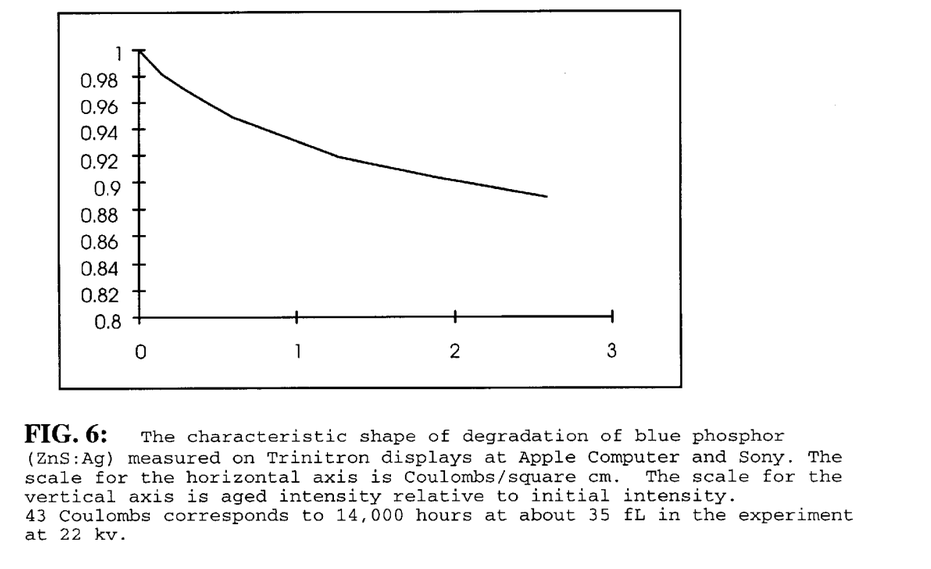
FIG. 6 is a graph displaying the results of empirical test data which depicts the more complex degradation curve of blue luminous efficiency degradation in Sony Trinitron® video monitors.

FIG. 6 is a graph of empirically-derived data for blue luminous efficiency degradation in Trinitron® display monitors. The graph in FIG. 6, however, does not conform to luminance degradation factors predicted using Pfahnl's Law. Instead, a more complex degradation curve was empirically observed for the blue phosphors. The rapid early degradation of blue phosphors illustrated in FIG. 6 causes a significant chromaticity shift in display monitors early in their lifetimes. The inventor of the present invention has improved the degradation curve yielded by Pfanhl's Law by adding a second degradation curve having a shorter time constant. Based on the empirical test data, the luminous efficiency degradation factor of the blue phosphors may be expressed as relative efficiency $\eta_{Blue}$, according to formula $$\eta_{Blue} = \left( \frac{\eta_{Blue(start)}}{\left( 1 + CN - \frac{L}{1 + SN} \right)(1 + L)} \right)$$

where $\eta_{Blue(start)}$ is the initial efficiency of blue phosphor, C is the phosphor burn sensitivity parameter, N is the dose of electrons deposited on the phosphor expressed in Coulombs per square centimeter, S is the shape of the blue component second degradation curve, and L is the amplitude of the blue component second degradation curve.

The present invention uses hue deviation factors in combination with the luminous efficiency degradation factors to calculate corrected tristimulus values used in compensating for aging of the CRT 36. A linear approximation of hue deviation factors $\Delta u'$ and $\Delta v'$, for each primary color, was found to adequately describe the change in color coordinates observed experimentally. The formulae used to calculate hue deviation factors $\Delta u'$ and $\Delta v'$ are $\Delta u'=ND_{u'}$, and $\Delta v'=ND_{v'}$ where $\Delta u'$ and $\Delta v'$ are the shift in color coordinates of the phosphor emission as observed through the faceplate 33, N is the total charge deposited on the phosphors 34, and $D_{u'}$ and $D_{v'}$ are the hue degradation factors for the u' and v' axes, respectively. This correction is applied to each phosphor independently, using each phosphor's respective accumulated dosage, as stored in non-volatile memory 24.

Figure 7:
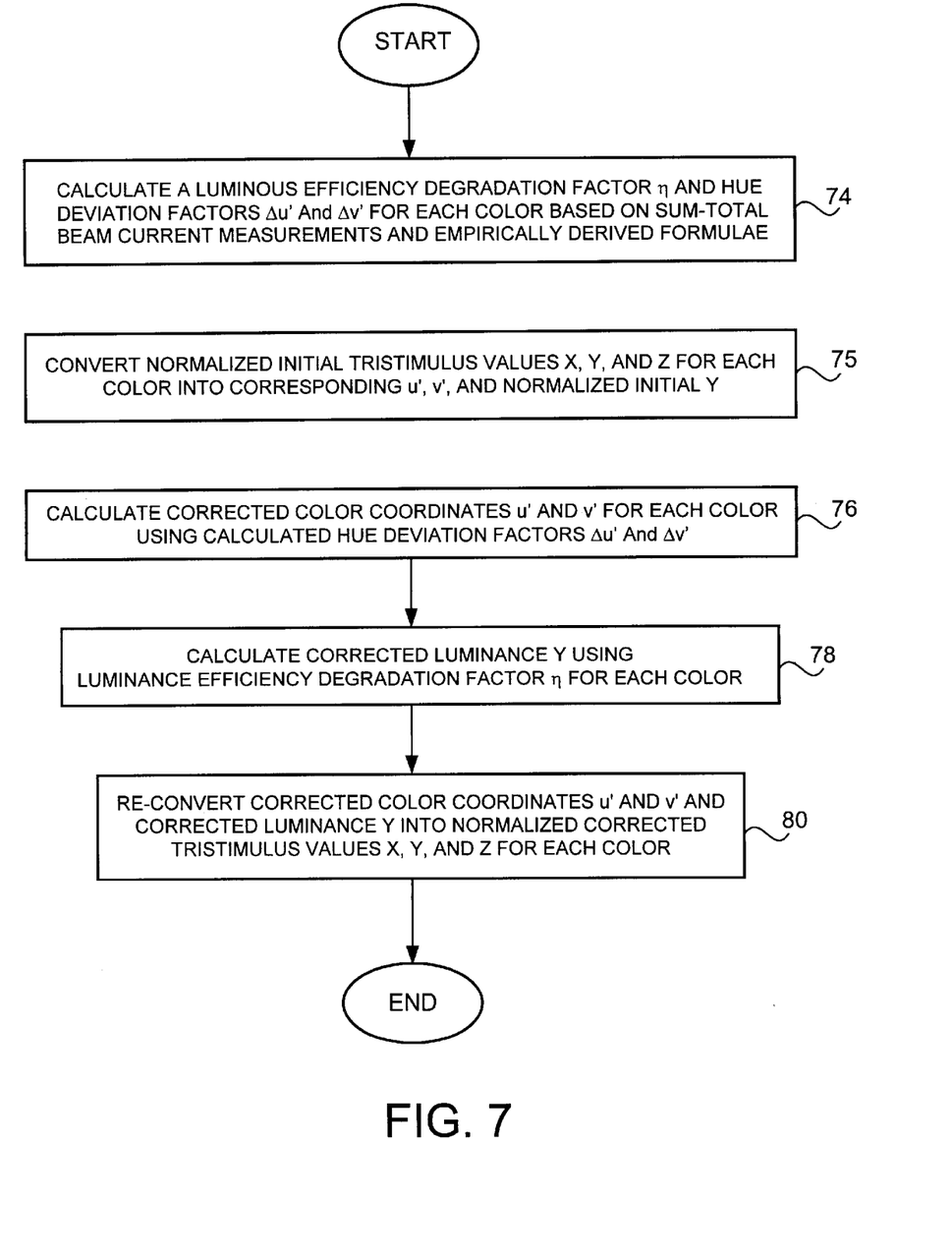
FIG. 7 is a flowchart of steps for calculating corrected tristimulus values X, Y, and Z for use in determining the adjustment of beam current necessary to compensate for aging of the phosphors and faceplate.

FIG. 7 is a flowchart detailing steps for applying luminous efficiency degradation values $\eta$ and hue deviation factors $\Delta u'$ and $\Delta v'$, to the normalized initial tristimulus values X, Y, and Z of a CRT, to obtain corrected tristimulus values for adjusting the beam current 32 to compensate for CRT aging.

The procedure begins in step 74 where a luminous efficiency degradation factor $\eta$ and hue deviation factors $\Delta u'$ and $\Delta v'$ are calculated for each color according to the prior discussion of FIGS. 5 and 6. In step 75, normalized initial tristimulus values for each color are converted into corresponding u', v', and normalized initial Y for each color. In step 76, u' is added with $\Delta u'$ to yield a corrected u' and v' is added with $\Delta v'$ to yield corrected v' for each color. In step 78, normalized initial tristimulus value Y for each color is multiplied by luminous efficiency degradation factor $\eta$ for each color to yield normalized corrected tristimulus value Y for each color. In step 80, corrected color coordinates u' and v' for each color, along with the normalized corrected tristimulus value Y for each color are re-converted back into normalized corrected tristimulus values X, Y, and Z for each color, yielding three sets of normalized corrected tristimulus values to be utilized when calculating beam current adjustments to compensate for aging of CRT 36.

Figure 8:
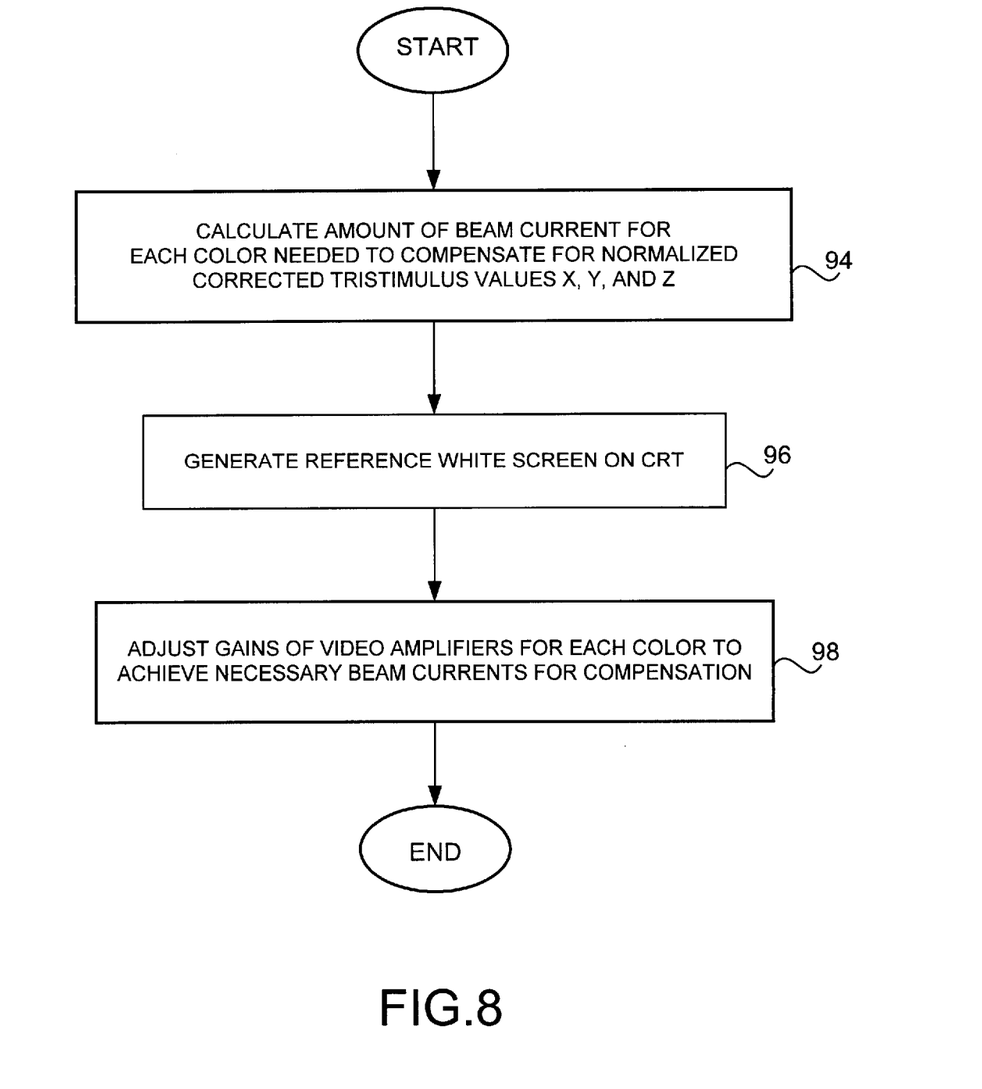
FIG. 8 is a flowchart of the process utilized in the present invention for calibration of a reference white screen display by adjusting beam currents based on corrected tristimulus values.

FIG. 8 is a flowchart of steps for adjusting the beam currents 32 to calibrate a reference white screen display to compensated for the aging of CRT 36. First, in step 94 host processor 10 calculates the amount of beam current necessary to compensate for normalized corrected tristimulus values X, Y, and Z for each color. In step 96, internal processor 23 generates a reference white screen on CRT 36. Finally, in step 98, the gain of the video amplifier 47 for each color is adjusted to produce the beam current on line 32 necessary to compensate for the aging of CRT 36. Completion of the FIG. 8 calibration procedure achieves the present invention's goal of accurate compensation for aging of the phosphors 34 and faceplate 33 in CRT 36.

The invention has been explained above with reference to a preferred embodiment. Other embodiments will be apparent to those skilled in the art, in light of this disclosure. For example, instead of adjusting the gains of the video amplifiers 47, a similar compensation could be effected on beam currents 32 by causing display controller 30 to adjust the magnitude of the video signals 28 input into video amplifiers 47. Further, other display devices such as plasma displays and light emitting diodes having various signal-receiving electrodes may be used in place of CRTs. Therefore, these and other variations upon, and modifications to, the preferred embodiments are intended to be covered by the present invention, which is limited only by the appended claims.

What is claimed is:

1. A system to compensate for the effects of aging upon color accuracy in a cathode ray tube comprising:
   a timer for generating a beam current measurement command at periodic intervals;
   a measuring circuit responsive to the timer, for making a sum-total beam current measurement; and
   a compensation circuit coupled to the cathode ray tube, for adjusting beam current in response to the sum-total beam current measurements.

2. A system to compensate for the effects of aging upon color accuracy in a cathode ray tube comprising:
   a timer for generating a beam current measurement command at periodic intervals;
   a measuring circuit responsive to the timer, for making a sum-total beam current measurement said measuring circuit comprising
      an internal processor for generating color digital video signals,
      a display controller, connected to the internal processor for converting the digital video signals into analog video signals, video amplifiers connected to the display controller for receiving, amplifying, and supplying amplified analog video signals to the cathode ray tube, current samplers coupled between the video amplifiers and the cathode ray tube, for sampling the video signals and generating analog beam current measurements, an analog-to-digital converter coupled between the current samplers and the internal processor, for converting the analog beam current measurements into digital beam current measurements, and non-volatile memory connected to the internal processor, for storing the sum-total beam current measurements;

and a compensation circuit coupled to the cathode ray tube, for adjusting beam current in response to the sum-total beam current measurements.

3. A system to compensate for the effects of aging upon color accuracy in a cathode ray tube comprising:

a timer for generating a beam current measurement command at periodic intervals;

a measuring circuit responsive to the timer, for making a sum-total beam current measurement, said measuring circuit comprising an internal processor for generating color digital video signals, display controller, connected to the internal processor for converting the digital video signals into analog video signals, video amplifiers connected to the display controller for receiving, amplifying, and supplying amplified analog video signals to the cathode ray tube, current samplers coupled between the video amplifiers and the cathode ray tube, for sampling the video signals and generating analog beam current measurements, an analog-to-digital converter coupled between the current samplers and the internal processor, for converting the analog beam current measurements into digital beam current measurements, and non-volatile memory connected to the internal processor, for storing the sum-total beam current measurements, said non-volatile memory being an Electrically Erasable Programmable Read-Only-Memory (EEPROM);

and a compensation circuit coupled to the cathode ray tube, for adjusting beam current in response to the sum-total beam current measurements.

4. A system to compensate for the effects of aging upon color accuracy in a cathode ray tube comprising:

a timer for generating a beam current measurement command at periodic intervals;

a measuring circuit responsive to the timer, for making a sum-total beam current measurement, said measuring circuit comprising an internal processor for generating color digital video signals, a display controller, connected to the internal processor for converting the digital video signals into analog video signals, video amplifiers connected to the display controller for receiving, amplifying, and supplying amplified analog video signals to the cathode ray tube, current samplers coupled between the video amplifiers and the cathode ray tube, for sampling the video signals and generating analog beam current measurements, an analog-to-digital converter coupled between the current samplers and the internal processor, for converting the analog beam current measurements into digital beam current measurements, and non-volatile memory connected to the internal processor, for storing the sum-total beam current measurements;

a compensation circuit coupled to the cathode ray tube, for adjusting beam current in response to the sum-total beam current measurements; and a video monitor cabinet containing the internal processor, display controller, video amplifiers, current samplers, cathode ray tube, analog-to-digital converter, and non-volatile memory.

5. A system to compensate for the effects of aging upon color accuracy in a cathode ray tube comprising:

a timer for generating a beam current measurement command at periodic intervals;

a measuring circuit responsive to the timer, for making a sum-total beam current measurement, said measuring circuit comprising an internal processor for generating color digital video signals, a display controller, connected to the internal processor for converting the digital video signals into analog video signals, video amplifiers connected to the display controller for receiving, amplifying, and supplying amplified analog video signals to the cathode ray tube, current samplers coupled between the video amplifiers and the cathode ray tube, for sampling the video signals and generating analog beam current measurements, an analog-to-digital converter coupled between the current samplers and the internal processor, for converting the analog beam current measurements into digital beam current measurements, and non-volatile memory connected to the internal processor, for storing the sum-total beam current measurements;

and a compensation circuit coupled to the cathode ray tube, for adjusting beam current in response to the sum-total beam current measurements, said compensating circuit comprising host processor means, connected to the internal processor means, for controlling the internal processor means to compensate for the effects of aging upon color accuracy in the cathode ray tube.

6. A system to compensate for the effects of aging upon color accuracy in a cathode ray tube comprising:

a timer for generating a beam current measurement command at periodic intervals;

a measuring circuit responsive to the timer, for making a sum-total beam current measurement, said measuring circuit comprising an internal processor for generating color digital video signals, a display controller, connected to the internal processor for converting the digital video signals into analog video signals, video amplifiers connected to the display controller for receiving, amplifying, and supplying amplified analog video signals to the cathode ray tube, said amplified analog video signals comprising separate red, green, and blue color signals, current samplers coupled between the video amplifiers and the cathode ray tube, for sampling the video signals and generating analog beam current measurements, an analog-to-digital converter coupled between the current samplers and the internal processor, for converting the analog beam current measurements into digital beam current measurements, and non-volatile memory connected to the internal processor, for storing the sum-total beam current measurements;

and a compensation circuit coupled to the cathode ray tube, for adjusting beam current in response to the sum-total beam current measurements.

7. A method of compensating for the effects of aging upon color accuracy in a cathode ray tube, comprising the steps of:

generating a beam current in a cathode ray tube;

measuring the beam current of the cathode ray tube at periodic intervals to produce a periodic beam current measurement;

calculating a calculated sum-total beam current measurement for the cathode ray tube; and compensating the beam current in the cathode ray tube as a function of the calculated sum-total beam current measurement.

8. A method of compensating for the effects of aging upon color accuracy in a cathode ray tube, comprising the steps of:

generating a beam current in a cathode ray tube;

measuring the beam current of the cathode ray tube at periodic intervals to produce a periodic beam current measurement;

calculating a calculated sum-total beam current measurement for the cathode ray tube, said step of calculating a calculated sum-total beam current measurement comprising the steps of providing a non-volatile memory for storing the sum-total beam current measurement for each of three primary color video amplifiers, storing into the non-volatile memory an initial value of zero for the sum-total beam current measurement for each of the three primary colors, adding the periodic beam current measurement for each video amplifier to the sum-total beam current measurement value previously stored in the non-volatile memory to form a new sum-total beam current measurement for each video amplifier, and storing the new sum-total beam current measurement in non-volatile memory to update the sum-total beam current measurement for each video amplifier;

and compensating the beam current in the cathode ray tube as a function of the calculated sum-total beam current measurement.

9. A method of compensating for the effects of aging upon color accuracy in a cathode ray tube, comprising the steps of:

generating a beam current in a cathode ray tube;

measuring the beam current of the cathode ray tube at periodic intervals to produce a periodic beam current measurement;

calculating a calculated sum-total beam current measurement for the cathode ray tube; and compensating the beam current in the cathode ray tube as a function of the calculated sum-total beam current measurement, said step of compensating the beam current comprising the steps of calculating, from the calculated sum-total beam current measurements for respective video amplifiers and from empirically-derived correction formulae, a luminous efficiency degradation factor $\eta$ and hue deviation factors $\Delta u'$ and $\Delta v'$, calculating corrected tristimulus values X, Y and Z from initial tristimulus values, the luminous efficiency degradation factor and the hue deviation factors, calculating, from the corrected tristimulus values X, Y and Z, amounts of beam current predicted to compensate for degradations in color accuracy, generating a known-value screen display on the cathode ray tube as a reference standard to calibrate the beam current of the video amplifier, and adjusting the gain of each video amplifier to produce beam current which compensates for the degraded color accuracy of the cathode ray tube.

10. A method of compensating for the effects of aging upon color accuracy in a cathode ray tube, comprising the steps of:

generating a beam current in a cathode ray tube;

measuring the beam current of the cathode ray tube at periodic intervals to produce a periodic beam current measurement;

calculating a calculated sum-total beam current measurement for the cathode ray tube; and compensating the beam current in the cathode ray tube as a function of the calculated sum-total beam current measurement, said step of compensating the beam current comprising the steps of calculating, from the calculated sum-total beam current measurements for respective video amplifiers and from empirically-derived correction formulae, a luminous efficiency degradation factor $\eta$ and hue deviation factors $\Delta u'$ and $\Delta v'$, said step of calculating a luminous efficiency degradation factor calculating luminous efficiency degradation factor $\eta$ for red and green according to the formula $$\eta = \left( \frac{\eta_{(start)}}{1 + CN} \right)$$

wherein $\eta_{(start)}$ is the initial efficiency of a red or green phosphor, C is the phosphor burn sensitivity parameter, and N is the dosage in Coulombs of electrons deposited per square centimeter of phosphor, calculating corrected tristimulus values X, Y and Z from initial tristimulus values, the luminous efficiency degradation factor and the hue deviation factors, calculating, from the corrected tristimulus values X, Y and Z, amounts of beam current predicted to compensate for degradations in color accuracy, generating a known-value screen display on the cathode ray tube as a reference standard to calibrate the beam current of the video amplifier, and adjusting the gain of each video amplifier to produce beam current which compensates for the degraded color accuracy of the cathode ray tube.

11. A method of compensating for the effects of aging upon color accuracy in a cathode ray tube, comprising the steps of:

generating a beam current in a cathode ray tube;
measuring the beam current of the cathode ray tube at periodic intervals to produce a periodic beam current measurement;
calculating a calculated sum-total beam current measurement for the cathode ray tube; and
compensating the beam current in the cathode ray tube as a function of the calculated sum-total beam current measurement, said step of compensating the beam current comprising the steps of
calculating, from the calculated sum-total beam current measurements for respective video amplifiers and from empirically-derived correction formulae, a luminous efficiency degradation factor $\eta$ and hue deviation factors $\Delta u'$ and $\Delta v'$, said step of calculating a luminous efficiency degradation factor calculates a luminous efficiency degradation factor $\eta_{Blue}$ for blue according to the formula $$\eta_{Blue} = \left( \frac{\eta_{Blue(start)}}{\left(1 + CN - \frac{L}{1+SN}\right)(l+L)} \right)$$

wherein $\eta_{Blue(start)}$ is the initial efficiency of a blue phosphor, C is the phosphor burn sensitivity parameter, N is the dosage in Coulombs of electrons deposited per square centimeter of phosphor, S is the shape of a blue component degradation modification curve, and L is the amplitude of a blue component degradation modification curve,
calculating corrected tristimulus values X, Y and Z from initial tristimulus values, the luminous efficiency degradation factor and the hue deviation factors,
calculating, from the corrected tristimulus values X, Y and Z, amounts of beam current predicted to compensate for degradations in color accuracy,
generating a known-value screen display on the cathode ray tube as a reference standard to calibrate the beam current of the video amplifier, and
adjusting the gain of each video amplifier to produce beam current which compensates for the degraded color accuracy of the cathode ray tube.

12. A method of compensating for the effects of aging upon color accuracy in a cathode ray tube, comprising the steps of:
generating a beam current in a cathode ray tube;
measuring the beam current of the cathode ray tube at periodic intervals to produce a periodic beam current measurement;
calculating a calculated sum-total beam current measurement for the cathode ray tube; and
compensating the beam current in the cathode ray tube as a function of the calculated sum-total beam current measurement, said step of compensating the beam current comprising the steps of
calculating, from the calculated sum-total beam current measurements for respective video amplifiers and from empirically-derived correction formulae, a luminous efficiency degradation factor $\eta$ and hue deviation factors $\Delta u'$ and $\Delta v'$, said step of calculating hue deviation factors comprising the steps of
dividing the initial individual red, green, and blue tristimulus values X, Y, and Z by each of the beam current values to produce normalized initial tristimulus values,
converting the normalized initial tristimulus values into equivalent color coordinates u', v', and normalized initial Y,
calculating hue deviation factors $\Delta u'$ and $\Delta v,'$ corresponding to shifts in color coordinates of the phosphor emissions from the cathode ray tube, according to the formulae $\Delta u'=ND_{u'}$ and $\Delta v'=ND_{v'}$, wherein N is the total charge in Coulombs deposited on the phosphor, and $D_{u'}$ and $D_{v'}$ are hue degradation factors for the u' and v' axes,
adding $\Delta u'$ to u' to produce corrected u', and
adding $\Delta v'$ to v' to produce corrected v',
calculating corrected tristimulus values X, Y and Z from initial tristimulus values, the luminous efficiency degradation factor and the hue deviation factors,
calculating, from the corrected tristimulus values X, Y and Z, amounts of beam current predicted to compensate for degradations in color accuracy,
generating a known-value screen display on the cathode ray tube as a reference standard to calibrate the beam current of the video amplifier, and
adjusting the gain of each video amplifier to produce beam current which compensates for the degraded color accuracy of the cathode ray tube.

13. A method of compensating for the effects of aging upon color accuracy in a cathode ray tube, comprising the steps of:
generating a beam current in a cathode ray tube;
measuring the beam current of the cathode ray tube at periodic intervals to produce a periodic beam current measurement;
calculating a calculated sum-total beam current measurement for the cathode ray tube; and
compensating the beam current in the cathode ray tube as a function of the calculated sum-total beam current measurement, said step of compensating the beam current comprising the steps of
calculating, from the calculated sum-total beam current measurements for respective video amplifiers and from empirically-derived correction formulae, a luminous efficiency degradation factor $\eta$ and hue deviation factors $\Delta u'$ and $\Delta v'$, said step of calculating hue deviation factors comprising the steps of
dividing the initial individual red, green, and blue tristimulus values X, Y, and Z by each of the beam current values to produce normalized initial tristimulus values,
converting the normalized initial tristimulus values into equivalent color coordinates u', v', and normalized initial Y,
calculating hue deviation factors $\Delta u'$ and $\Delta v,'$ corresponding to shifts in color coordinates of the phosphor emissions from the cathode ray tube, according to the formulae $\Delta u'=ND_{u'}$ and $\Delta v'=ND_{v'}$, wherein N is the total charge in Coulombs deposited on the phosphor, and $D_{u' \text{ and } Dv'}$ are hue degradation factors for the u' and v' axes,
adding $\Delta u'$ to u' to produce corrected u', and
adding $\Delta v'$ to v' to produce corrected v',
calculating corrected tristimulus values X, Y and Z from initial tristimulus values, the luminous efficiency degradation factor and the hue deviation factors, said step of calculating corrected tristimulus values comprising the further step of
multiplying the normalized initial tristimulus value Y by luminous efficiency degradation factor $\eta$ to produce a normalized corrected tristimulus value Y, calculating, from the corrected tristimulus values X, Y and Z, amounts of beam current predicted to compensate for degradations in color accuracy, generating a known-value screen display on the cathode ray tube as a reference standard to calibrate the beam current of the video amplifier, and adjusting the gain of each video amplifier to produce beam current which compensates for the degraded color accuracy of the cathode ray tube.

14. A method of compensating for the effects of aging upon color accuracy in a cathode ray tube, comprising the steps of:

generating a beam current in a cathode ray tube;

measuring the beam current of the cathode ray tube at periodic intervals to produce a periodic beam current measurement;

calculating a calculated sum-total beam current measurement for the cathode ray tube; and compensating the beam current in the cathode ray tube as a function of the calculated sum-total beam current measurement, said step of compensating the beam current comprising the steps of calculating, from the calculated sum-total beam current measurements for respective video amplifiers and from empirically-derived correction formulae, a luminous efficiency degradation factor $\eta$ and hue deviation factors $\Delta u'$ and $\Delta v'$, said step of calculating hue deviation factors comprising the steps of dividing the initial individual red, green, and blue tristimulus values X, Y, and Z by each of the beam current values to produce normalized initial tristimulus values, converting the normalized initial tristimulus values into equivalent color coordinates u', v', and normalized initial Y, calculating hue deviation factors $\Delta u'$ and $\Delta v$,' corresponding to shifts in color coordinates of the phosphor emissions from the cathode ray tube, according to the formulae $\Delta u'=ND_{u'}$ and $\Delta v'=ND_{v'}$, wherein N is the total charge in Coulombs deposited on the phosphor, and $D_{u'}$ and $D_{v'}$ are hue degradation factors for the u' and v' axes, adding $\Delta u'$ to u' to produce corrected u', and adding $\Delta v'$ to v' to produce corrected v', calculating corrected tristimulus values X, Y and Z from initial tristimulus values, the luminous efficiency degradation factor and the hue deviation factors, said step of calculating corrected tristimulus values comprising the further step of multiplying the normalized initial tristimulus value Y by luminous efficiency degradation factor $\eta$ to produce a normalized corrected tristimulus value Y, reconverting corrected color coordinates u' and v', and the normalized corrected tristimulus value Y into equivalent normalized corrected tristimulus values X, Y, and Z, calculating, from the corrected tristimulus values X, Y and Z, amounts of beam current predicted to compensate for degradations in color accuracy, generating a known-value screen display on the cathode ray tube as a reference standard to calibrate the beam current of the video amplifier, and adjusting the gain of each video amplifier to produce beam current which compensates for the degraded color accuracy of the cathode ray tube.

15. A method of compensating for the effects of aging upon color accuracy in a cathode ray tube, comprising the steps of:

generating a beam current in a cathode ray tube;

measuring the beam current of the cathode ray tube at periodic intervals to produce a periodic beam current measurement;

calculating a calculated sum-total beam current measurement for the cathode ray tube; and compensating the beam current in the cathode ray tube as a function of the calculated sum-total beam current measurement, said step of compensating the beam current comprising the steps of calculating, from the calculated sum-total beam current measurements for respective video amplifiers and from empirically-derived correction formulae, a luminous efficiency degradation factor $\eta$ and hue deviation factors $\Delta u'$ and $\Delta v'$, calculating corrected tristimulus values X, Y and Z from initial tristimulus values, the luminous efficiency degradation factor and the hue deviation factors, calculating, from the corrected tristimulus values X, Y and Z, amounts of beam current predicted to compensate for degradations in color accuracy, generating a known-value screen display on the cathode ray tube as a reference standard to calibrate the beam current of the video amplifier, said step of generating a known-value screen display generating a white screen display, and adjusting the gain of each video amplifier to produce beam current which compensates for the degraded color accuracy of the cathode ray tube.

16. A system to compensate for the effects of aging upon color accuracy in a cathode ray tube, comprising:

means for generating a beam current in the cathode ray tube;

means for measuring the beam current in the cathode ray tube at periodic intervals to produce a periodic beam current measurement;

means for calculating a calculated sum-total beam current measurements for the cathode ray tube; and means for compensating the beam current as a function of the calculated sum-total beam current measurement, to correct for effects of aging upon color accuracy in the cathode ray tube.

* * * * *